United States Patent [19]
Henrick et al.

[11] 3,903,128
[45] Sept. 2, 1975

[54] BIS(CYCLOPROPANEMETHYL)CYCLOAL-KYLENE-DITHIOATES

[75] Inventors: Clive A. Henrick; Gerardus B. Staal, both of Palo Alto, Calif.

[73] Assignee: Zoecon Corporation, Palo Alto, Calif.

[22] Filed: Nov. 19, 1973

[21] Appl. No.: 417,359

[52] U.S. Cl............... 260/455 R; 424/301; 260/485
[51] Int. Cl.².................................... C07C 153/09
[58] Field of Search.............................. 260/455 R

[56] References Cited
UNITED STATES PATENTS
3,673,237   6/1972   Janiak.............................. 260/455 R Primary Examiner—Elbert L. Roberts
Assistant Examiner—D. R. Phillips
Attorney, Agent, or Firm—Donald W. Erickson

[57] ABSTRACT

Organic compounds characterized by two cyclopropyl moieties, synthesis thereof, and compositions thereof for the control of mites.

9 Claims, No Drawings

BIS(CYCLOPROPANEMETHYL)CYCLOALKYLENE-DITHIOATES

This invention relates to novel compounds, synthesis thereof, compositions thereof and the control of mites.

The compounds of the present invention are effective for the control of mites and spider mites. Spider mites are plant feeders and cause serious damage to orchard trees, field crops, greenhouse plants and other vegetation. They feed on the foliage or fruit of plants and trees and attack a variety of plants and trees due to their wide distribution. Spider mites of the family Tetranychidae, such as *Tetranychus urticae, Tetranychus canadensis Tetranychus cinnabarinus, Tetranychus pacificus, Byrobia praetiosa Oligonychus pratensis, Oligonychus ilicis, Panonychus citri, Panonychus ulmi,* and similar related species, are of particular biological interest and economic importance. Other mites are those of the family Tarsonemidae, such as *Steneotarsonemus pallidus*.

Compounds of the present invention of the following formula A are effective control agents for spider mites.

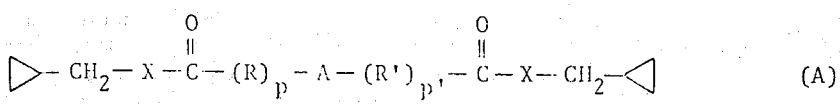
(A)

wherein
A is cycloalkylene of four to eight carbon atoms, each optionally substituted by one or more alkyl, alkoxy, or halogen groups;
each of R and R' is alkylene or alkenylene;
each of p and p' is zero or 1; and
X is oxygen or sulfur.

Hereinafter, each of A, R, R', X, p' and p is as defined above unless otherwise specified.

The compounds of formula A are applied to the mite at any stage, namely, during the egg, larval, nymphal or adult stages in view of their effect in causing inhibition of egg hatching abnormal development leading to death, inability to pass from one stage to the next, or inability to reproduce. Some of the compounds also exhibit a residual ovicidal effect. One or more compounds of formula A can be applied at dosage levels of the order of 0.001 to 1 percent. Suitable carrier substances include liquid or solid inert carriers, such as water, acetone, xylene, mineral or vegetable oils, talc, vermiculite, and silica. Treatment of mites in accordance with the present invention can be accomplished by spraying, dusting, or otherwise contacting the mites and/or their eggs or larvae directly or indirectly. Generally, a concentration of less than 25 percent of active compound is employed, although a higher concentration of the active compound can be used depending on the type of application apparatus. The formulations can include emulsifying agents and wetting agents to assist in the application and effectiveness of the active ingredient.

Preferred compounds of the present invention are those wherein X is oxygen, and each of R and R' is methylene, ethylene, trimethylene, tetramethylene, vinylene or propenylene or p and p' are zero.

Particularly preferred compounds are those where A is cycloalkylene, R and R' are methylene when p and p' are one or p and p' are zero.

The esters and thioesters of this invention are prepared by conventional esterification methods, for example by reaction of an acid halide of the formula

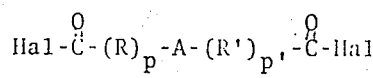

with at least 2 molar equivalents of cyclopropanemethyl alcohol or cyclopropanemethyl hydrosulfide to obtain the corresponding ester or thioester. The reaction may be carried out neat or in an organic solvent inert to the reaction, such as a hydrocarbon or ether solvent. The reaction proceeds at room temperature satisfactorily, although higher or lower temperatures may be used. The preparation of the thioester is usually carried out in the presence of pyridine.

Alternatively, the esters may be prepared by transesterification of a corresponding alkyl ester with the lithium salt of cyclopropanemethyl alcohol or esterification with cyclopropanemethyl alcohol and acid catalyst in an inert solvent.

Cyclopropanemethyl alcohol can be prepared as described by Sarel and Newman, *J. Am. Chem. Soc.* 78, 5416 (1956); Sneen et al., ibid, 83, 4843 (1961); Siegel and Bergstron, ibid 72, 3815 (1950) and 74, 145 (1952); U.S. Pat. Nos. 2,294,084 and 3,074,984; and references cited therein.

The term "alkyl," as used herein, refers to a straight or branched chain saturated aliphatic hydrocarbon group of one to 15 carbon atoms, e.g., methyl, ethyl, propyl, i-propyl, n-butyl, s-butyl, t-butyl, pentyl, hexyl, heptyl, n-octyl-2-methyloctyl, nonyl, decyl, undecyl, 2-methylundecyl, 6-methylundecyl, dodecyl, pentadecyl and the like. The term "lower alkyl" refers to an alkyl group of one to six carbon atoms.

The term "alkoxy," as used herein, refers to a straight or branched chain saturated aliphatic hydrocarbonoxy group of one to 15 carbon atoms, e.g., methoxy, ethoxy, n-propoxy, i-propoxy, n-butoxy, i-butoxy, t-butoxy, n-heptyloxy, n-dodecyloxy, 2-methyloctyloxy, and the like.

The term "alkylene," as used herein, refers to a bivalent radical derived from an alkane containing one to six carbon atoms by the removal of two hydrogen atoms from one or two carbon atoms of the alkane.

The term "alkenylene," as used herein, refers to a bivalent radical derived from an alkene, containing two to six carbon atoms and one or two sites of olefinic unsaturation, by the removal of two hydrogen atoms from one or two carbon atoms of the alkene.

The term "halogen," as used herein, refers to fluorine, chlorine, and bromine.

The esters of the present invention are useful for the control of mites and ticks which are ectoparasitic on animals and birds. The esters can be applied in either solution or in powder (dust) form in a conventional manner.

The following examples are provided to illustrate the syntheses of the compounds of the present invention and the practice of the present invention. Temperature is reported in degrees Centigrade.

EXAMPLE 1

To a mixture of 4.0 g. of trans-1,4-cyclohexanedicarboxylic acid, 60 ml. dry ether, and 4.5 ml. of thionyl chloride at 24° is added 1.0 ml. dry dimethyl formamide. The mixture is then stirred at room temperature for 5 days. The upper layer of the resultant biphasic mixture is separated and the solvent removed. To the remaining residue is added 80 ml. dry ether and 4.45 g. of cyclopropanemethyl alcohol. The reaction mixture is cooled to 0°; 5.6 ml. dry pyridine is added. The reaction mixture is allowed to warm to room temperature and stirred for 10 days. A mixture of ether and water is added, the ether layer is separated, and the aqueous layer is extracted twice with ether. The combined organic phases are washed with 2 N sulfuric acid, 10 percent aqueous sodium carbonate, water, aqueous saturated copper sulfate, water and brine, dried over calcium sulfate, the solvent is removed and the pale yellow liquid residue is allowed to crystallize overnight. The crystalline material is separated and distilled (b.p. 123°–126° at 0.03 mm) to yield 0.8 ml. of bis(cyclopropanemethyl 1,4-cyclohexanedicarboxylate.

Following the procedure of Example 1, the diacids of Column I are reacted with cyclopropanemethyl alcohol to form the esters of Column II.

I 1,1-cyclobutanedicarboxylic acid
2-methyl-1,1-cyclobutanedicarboxylic acid
1,2-cyclobutanedicarboxylic acid
1-chloro-1,2-cyclobutanedicarboxylic acid
3-methyl-1,2-cyclobutanedicarboxylic acid
1,2-cyclopentanedicarboxylic acid
3-methyl-1,2-cyclopentanedicarboxylic acid
4-t-butyl-1,2-cyclopentanedicarboxylic acid
4-methyl-1,3-cyclopentanedicarboxylic acid
1,3-cyclopentanedicarboxylic acid
1,4-cyclooctanedicarboxylic acid
1,5-cyclooctanedicarboxylic acid
1,2-cyclohexanedicarboxylic acid
4-bromo-5-chloro-1,2-cyclohexanedicarboxylic acid
3-ethyl-1,2-cyclohexanedicarboxylic acid
1,3-cyclohexanedicarboxylic acid
2,5-dimethyl-1,4-cyclohexanedicarboxylic acid
2-methoxy-1,4-cyclohexanedicarboxylic acid
2-isopropyl-1,4-cyclohexanedicarboxylic acid

II 1,1-bis(cyclopropanemethyl) cyclobutanedicarboxylate
1,1-bis(cyclopropanemethyl) 2-methylcyclobutanedicarboxylate
1,2-bis(cyclopropanemethyl) cyclobutanedicarboxylate
1,2-bis(cyclopropanemethyl) 1-chlorocyclobutanedicarboxylate
1,2-bis(cyclopropanemethyl) 3-methylcyclobutanedicarboxylate
1,2-bis(cyclopropanemethyl) cyclopentanedicarboxylate
1,2-bis(cyclopropanemethyl) 3-methylcyclopentanedicarboxylate
1,2-bis(cyclopropanemethyl) 4-t-butylcyclopentanedicarboxylate
1,3-bis(cyclopropanemethyl) 4-methylcyclopentanedicarboxylate
1,3-bis(cyclopropanemethyl) cyclopentanedicarboxylate
1,4-bis(cyclopropanemethyl) cyclooctanedicarboxylate
1,5-bis(cyclopropanemethyl) cyclooctanedicarboxylate
1,2-bis(cyclopropanemethyl) cyclohexanedicarboxylate
1,2-bis(cyclopropanemethyl) 4-bromo-5-chlorocyclohexanedicarboxylate
1,2-bis(cyclopropanemethyl) 3-ethylcyclohexanedicarboxylate
1,3-bis(cyclopropanemethyl) cyclohexanedicarboxylate
1,4-bis(cyclopropanemethyl) 2,5-dimethylcyclohexanedicarboxylate
1,4-bis(cyclopropanemethyl) 2-methoxycyclohexanedicarboxylate
1,4-bis(cyclopropanemethyl) 2-isopropylcyclohexanedicarboxylate The compounds of the present invention wherein each of $p$ and $p'$ is 1 and each of R and R' is unbranched alkylene can be prepared by reducing an acid of the formula HOOC—A—COOH with lithium aluminum hydride to yield a diol which is treated with phosphorus tribromide to give $BrCH_2$—A—$CH_2Br$. The dihalide is then reacted with potassium cyanide in dimethyl formamide and the resultant dicyamide hydrolyzed to yield HOOC—$CH_2$—A—$CH_2$—COOH. Similarly, ethylene groups can be added by reducing an acid of the formula HOOC—A—COOH with lithium aluminum hydride, reacting the resultant diol with phosphorus tribromide followed by treatment with diethyl malonate in basic solution with acidification and decarboxylation to the diacid HOOC—$(CH_2)_2$—A—$(CH_2)_2$—COOH. These processes can be repeated until the desired number of methylene and/or ethylene groups have been added.

Following the procedure of Example 1, the esters of Column IV can be prepared from cyclopropanemethyl alcohol and the acids of Column III.

III 1,2-cyclobutanediacetic acid
1,3-cyclobutanedipropionic acid
1,2-cyclopentanediacetic acid
1,2-cyclopentanedibutyric acid
1,4-cycloheptanediacetic acid
1,2-cycloheptanedivaleric acid
1,4-cyclooctanediacetic acid
1,5-cyclooctanedihexanoic acid
1,2-cyclohexanediacetic acid
1,4-cyclohexanediacetic acid
1,4-cyclohexanedipropionic acid
1,4-cyclohexanedibutyric acid
1,4-cyclohexanedivaleric acid
1,4-cyclohexanedihexanoic acid

IV 1,2-bis(cyclopropanemethyl)cyclobutanediacetate
1,3-bis(cyclopropanemethyl)cyclobutanedipropionate
1,2-bis(cyclopropanemethyl)cyclopentanediacetate
1,2-bis(cyclopropanemethyl)cyclopentanedibutyrate
1,4-bis(cyclopropanemethyl)cycloheptanediacetate
1,2-bis(cyclopropanemethyl)cycloheptanedivalerate
1,4-bis(cyclopropanemethyl)cyclooctanediacetate
1,5-bis(cyclopropanemethyl)cyclooctanedihexanoate
1,2-bis(cyclopropanemethyl)cyclohexanediacetate
1,4-bis(cyclopropanemethyl)cyclohexanediacetate 1,4-bis(cyclopropanemethyl)cyclohexanedipropionate
1,4-bis(cyclopropanemethyl)cyclohexanedibutyrate
1,4-bis(cyclopropanemethyl)cyclohexanedivalerate
1,4-bis(cyclopropanemethyl)cyclohexanedihexanoate Branching can be introduced by treatment of a dicarboxylic acid with two equivalents of alkyllithium to yield a diketone

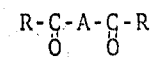

which is then reacted with triethyl phosphonoacetate to yield

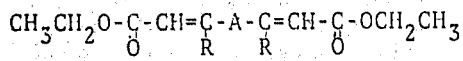

which is then reduced, if a saturated chain is desired, and saponified to the diacid.

Branching can also be introduced by esterifing the dicarboxylic acid with methanol in the presence of an acid catalyst and then treating the resultant ester with excess Grignard reagent alkyl-MgX to yield a tertiary diol which is then reacted with triethyl phosphonoacetate to yield

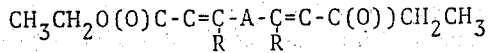

which is then reduced if a saturated chain is desired and saponified to the diacid.

Using the above procedures and/or combinations thereof, the acids of Column V are prepared.

V 1,2-bis(1-carboxyethyl)cyclobutane
1,3-bis(1-carboxy-1-methylethyl)cyclobutane
1,2-bis(1-carboxyethyl)cyclopentane
1,4-bis(3-carboxy-2-methylpropyl)cycloheptane
1,4-bis(1-carboxyethyl)cyclooctane
1,4-bis(1-carboxyethyl)cyclohexane
1,4-bis(3-carboxy-2-methylpropyl)cyclohexane
1,4-bis(2-carboxy-1-methylethyl)cyclohexane The acids where R is —CH=CH— can be prepared by treating a dialdehyde compound of the formula

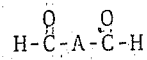

with at least 2 molar equivalents of triethyl phosphonoacetate in dimethyl formamide solution containing a slight molar excess of sodium hydroxide. The reaction is carried out under nitrogen and at from 20° to reflux. The resultant diethyl ester is then saponified or hydrolyzed to the desired diacid. As is readily apparent, this procedure for adding the —HC=CH— group can be combined with the foregoing procedures for preparing branching in order to arrive at the desired acid. Using these methods, the acids of Column VI can be prepared.

VI 1,3-bis(2-carboxyvinyl)cyclobutane
1,2-bis(3-carboxy-2-propen-1-yl)cyclopentane
1,4-bis(3-carboxy-2-methyl-2-propen-1-yl)cycloheptane
1,5-bis(2-carboxyvinyl)cyclooctane
1,4-bis(2-carboxyvinyl)cyclohexane
1,4-bis(3-carboxy-2-propen-1-yl)cyclohexane
1,4-bis(3-carboxy-2-methyl-2-propen-1-yl)cyclohexane Using the procedure of Example 1, the esters of Column VII are prepared from the acids of Columns V and VI and cyclopropanemethyl alchol.

VII 1,2-bis(1-cyclopropanemethoxycarbonylethyl)cyclobutane
1,3-bis(1-cyclopropanemethoxycarbonyl-1-methylethyl)cyclobutane
1,2-bis(1-cyclopropanemethoxycarbonylethyl)cyclopentane
1,4-bis(1-cyclopropanemethoxycarbonyl-2-methylpropyl)cycloheptane
1,4-bis(1-cyclopropanemethoxycarbonylethyl)cyclooctane
1,4-bis(1-cyclopropanemethoxycarbonylethyl)cyclohexane
1,4-bis(3-cyclopropanemethoxycarbonyl-2-methylpropyl)cyclohexane
1,4-bis(2-cyclopropanemethoxycarbonyl-1-methylethyl)cyclohexane
1,3-bis(2-cyclopropanemethoxycarbonylvinyl)cyclobutane
1,2-bis(3-cyclopropanemethoxycarbonyl-2-propen-1-yl)cyclopentane
1,4-bis(3-cyclopropanemethoxycarbonyl-2-methyl-2-propen-1-yl)cycloheptane
1,5-bis(2-cyclopropanemethoxycarbonylvinyl)cyclooctane
1,4-bis(2-cyclopropanemethoxycarbonylvinyl)cyclohexane
1,4-bis(3-cyclopropanemethoxycarbonyl-2-propen-1-yl)cyclohexane
1,4-bis(3-cyclopropanemethoxycarbonyl-2-methyl-2-propen-1-yl)cyclohexane

EXAMPLE 2

To a mixture of 2.46 g. of anhydrous sodium hydrosulfide and 14 ml. dimethylformamide is added with cooling 4.0 g. of cyclopropanemethyl chloride. After standing 2 hours at room temperature, water and ether are added, the aqueous phase separated and extracted with ether, and the combined organic phases washed with brine, dried over calcium sulfate, filtered and distilled to yield cyclopropanemethyl mercaptan, boiling at 97°–98° at 1 atm.

Thioesters are prepared by treating a solution of the corresponding diacid in benzene with oxalyl chloride, heating for 1 to 8 hours and then removing the benzene solvent. To this concentrate is added an inert solvent and at least a two-fold molar excess of the cyclopropanemethyl mercaptan prepared in Example 2 followed at 0° by at least a two-fold excess of pyridine. The reaction mixture is stirred and then refluxed for from 1 to 5 days and the product separated by pouring the mixture into water, adding ether, separating the organic phase, washing with aqueous sodium bicarbonate and brine, drying over calcium sulfate and removing the solvent.

In the above manner, the diacids of Example 1 and

Column I are converted to the esters of Column VIII.

VIII 1,4-bis(S-cyclopropanemethyl) cyclohexanedithioate
1,1-bis(S-cyclopropanemethyl) cyclobutanedithioate
1,1-bis(S-cyclopropanemethyl) 2-methylcyclobutanedithioate
1,2-bis(S-cyclopropanemethyl) cyclobutanedithioate
1,2-bis(S-cyclopropanemethyl) 1-chlorocyclobutanedithioate
1,2-bis(S-cyclopropanemethyl) 3-methylcyclobutanedithioate
1,2-bis(S-cyclopropanemethyl) cyclopentanedithioate
1,2-bis(S-cyclopropanemethyl) 3-methylcyclopentanedithioate
1,2-bis(S-cyclopropanemethyl) 4-t-butylcyclopentanedithioate
1,3-bis(S-cyclopropanemethyl) 4-methylcyclopentanedithioate
1,3-bis(S-cyclopropanemethyl) cyclopentanedithioate
1,4-bis(S-cyclopropanemethyl) cyclooctanedithioate
1,5-bis(S-cyclopropanemethyl) cyclooctanedithioate
1,2-bis(S-cyclopropanemethyl) cyclohexanedithioate
1,2-bis(S-cyclopropanemethyl) 4-bromo-5-chlorocyclohexanedithioate
1,2-bis(S-cyclopropanemethyl) 3-ethylcyclohexanedithioate
1,3-bis(S-cyclopropanemethyl) cyclohexanedithioate
1,4-bis(S-cyclopropanemethyl) 2,5-dimethylcyclohexanedithioate
1,4-bis(S-cyclopropanemethyl) 2-methoxycyclohexanedithioate
1,4-bis(S-cyclopropanemethyl) 2-isopropylcyclohexanedithioate A wettable powder suitable for field application after dilution can be formulated by blending and then air-milling a mixture of 20 to 30 percent of an ester or thioester of this invention, 60 to 70 percent of a solid carrier such as Attaclay X-250, 1 to 3 percent of an anionic surfactant, such as Igepon T-77, and 3 to 5 percent of a dispersing agent such as Marasperse N-22.

The wettable powder is applied, after dilution with water, using ultra-low volume sprayers. Dilutions containing the ester within a concentration range of about 0.01 to 10 percent are generally employed.

The compound 1,4-bis(cyclopropanemethyl) cyclohexanedicarboxylate can be formulated as a 25 percent active ingredient dust having the following composition:

| | |
|---|---|
| bis(cyclopropanemethyl) 1,4-cyclohexanedicarboxylate | 25% |
| Synthetic Calcium Silicate | 5% |
| Attapulgite Clay | 68.5% |
| Dust Inhibitor and Sticker | 1.5% |

The compound bis(cyclopropanemethyl) 1,4-cyclohexanedicarboxylate is formulated as an emulsifiable concentrate having the following composition:

| | |
|---|---|
| bis(cyclopropanemethyl) 1,4-cyclohexanedicarboxylate | 57.7% |

-Continued

| | |
|---|---|
| Xylene | 34.5% |
| Mixture of nonionic and anionic surfactants | 8.0% |

The mite control agents of the present invention can be used alone in an inert agriculturally acceptable carrier substance for the control of mites (Acarina) or can be used in mixture with insecticides and/or juvenile hormone analogs known in the art to provide a broader spectrum of activity.

The effectiveness of the compounds of the present invention is demonstrated below.

Adults (*Tetranychus urticae*) are allowed to oviposit for 24 hours on castor bean leaf discs (diameter 1 cm.) on moist cottonwool.

After 24 hours, the adults are removed and the leaf discs are then dipped in acetone solution of bis(cyclopropanemethyl) 1,4-cyclohexanedicarboxylate at 0.1 percent.

After submersion for one second, the solvent on the leaf discs is allowed to dry and the leaf discs are then glued to a plastic petri dish to prevent crumpling.

Six days later (when all the eggs on untreated discs have emerged), the number of unhatched eggs is calculated as a percentage of the total number originally present, corrected for any spontaneous non-emergence observed in control discs treated only with solvent (Abbott correction).

Bis(cyclopropanemethyl) 1,4-cyclohexanedicarboxylate at the above concentration prevents the hatching of 100 percent of the eggs.

We claim as our invention:

1. A compound of the formula wherein,

A is cycloalkylene of four to eight carbon atoms, optionally substituted by one or more alkyl, alkoxy, or halogen groups;

each of R and R′ is alkylene or alkenylene; and each of *p* and *p′* is zero or the positive integer 1.

2. A compound according to claim 1 wherein *p* and *p′* are zero and A is cyclohexylene, cyclobutylene or cyclopentylene, optionally substituted by one or two methyl, ethyl, isopropyl, t-butyl, methoxy, chloro or bromo groups.

3. A compound according to claim 2 wherein A is cyclohexylene or cyclohexylene substituted by one or two methyl, ethyl, isopropyl, chloro or bromo groups.

4. The compound 1,4-bis(S-cyclopropanemethyl) cyclohexanedithioate, according to claim 3.

5. The compound 1,4-bis(S-cyclopropanemethyl) 2-methoxycyclohexanedithioate, according to claim 3.

6. The compound 1,4-bis(S-cyclopropanemethyl) 2-isopropylcyclohexanedithioate, according to claim 3.

7. The compound 1,4-bis(S-cyclopropanemethyl) 2,-5-dimethylcyclohexanedithioate, according to claim 3.

8. The compound 1,3-bis (S-cyclopropanemethyl) cyclohexanedithioate, according to claim 3.

9. The compound 1,2-bis(S-cyclopropanemethyl) cyclohexanedithioate, according to claim 3.

* * * * *